US011202258B2

(12) United States Patent
Ghosh

(10) Patent No.: US 11,202,258 B2
(45) Date of Patent: Dec. 14, 2021

(54) RESTRICTIVE SERVICE PERIOD FOR POWER SAVE DEVICES

(71) Applicant: Intel IP Corporation, Santa Clara, CA (US)

(72) Inventor: Chittabrata Ghosh, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/237,994

(22) Filed: Jan. 2, 2019

(65) Prior Publication Data

US 2019/0306794 A1 Oct. 3, 2019

Related U.S. Application Data

(63) Continuation of application No. 15/197,293, filed on Jun. 29, 2016, now abandoned.

(60) Provisional application No. 62/275,171, filed on Jan. 5, 2016.

(51) Int. Cl.
*H04W 52/02* (2009.01)
*H04W 28/02* (2009.01)

(52) U.S. Cl.
CPC ... *H04W 52/0216* (2013.01); *H04W 28/0221* (2013.01); *H04W 52/0219* (2013.01); *Y02D 30/70* (2020.08)

(58) Field of Classification Search
CPC ............... H04W 84/12; H04W 74/006; H04W 52/0216; H04W 4/00; H04W 72/042; H04W 74/004; H04W 74/008; H04W 74/04; H04W 74/06; H04W 74/0833; H04W 8/245; H04W 52/0219
See application file for complete search history.

(56) References Cited

U.S. PATENT DOCUMENTS

| | | | |
|---|---|---|---|
| 9,572,102 B2* | 2/2017 | Hiremath | H04W 52/0209 |
| 9,854,606 B2* | 12/2017 | Seok | H04W 74/04 |
| 2009/0196211 A1* | 8/2009 | Wentink | H04W 52/0225 370/311 |
| 2013/0223419 A1* | 8/2013 | Ghosh | H04W 52/0235 370/338 |
| 2014/0378121 A1* | 12/2014 | Alanen | H04W 8/245 455/420 |
| 2015/0103767 A1* | 4/2015 | Kim | H04W 74/008 370/329 |
| 2015/0382283 A1* | 12/2015 | Wang | H04W 52/02 370/328 |
| 2016/0212702 A1* | 7/2016 | Ghosh | H04L 47/10 |
| 2017/0272138 A1* | 9/2017 | Chun | H04L 29/08 |

(Continued)

*Primary Examiner* — Sai Aung
(74) *Attorney, Agent, or Firm* — Eversheds Sutherland (US) LLP

(57) ABSTRACT

This disclosure describes systems, methods, and apparatus related to a restrictive target wake time (TWT) service period (SP) system. A device may determine a beacon frame to be sent to one or more power save devices. The device may determine a time duration of a TWT SP associated with the one or more power save devices. The device may determine a first trigger frame including a cascade indication. The device may determine a first time associated with the first trigger frame. The device may cause to send the trigger frame to the one or more power save devices based at least in part on a remaining duration of the TWT SP.

17 Claims, 7 Drawing Sheets

(56) References Cited

U.S. PATENT DOCUMENTS

2017/0280383 A1\* 9/2017 Park ................. H04W 74/06
2017/0367118 A1\* 12/2017 Choi ................ H04W 84/12

\* cited by examiner

RESTRICTIVE SERVICE PERIOD FOR POWER SAVE DEVICES

CROSS-REFERENCE TO RELATED APPLICATIONS

This application is a continuation of U.S. Non-provisional Application No. 15/197,293 filed Jun. 29, 2016, which claims the benefit of U.S. Provisional Application No. 62/275,171 filed Jan. 5, 2016, the disclosures of which are incorporated herein by reference in their entireties

TECHNICAL FIELD

This disclosure generally relates to systems and methods for wireless communications and, more particularly, to a restrictive target wake time (TWT) service period (SP).

BACKGROUND

Wireless devices are becoming widely prevalent and are increasingly requesting access to wireless channels. A next generation WLAN, IEEE 802.11ax or high-efficiency WLAN (HEW) utilizes orthogonal frequency-division multiple access (OFDMA) in channel allocation. Beacon frames are management frames that contain information related to transmissions between devices.

DETAILED DESCRIPTION

Figure 1:
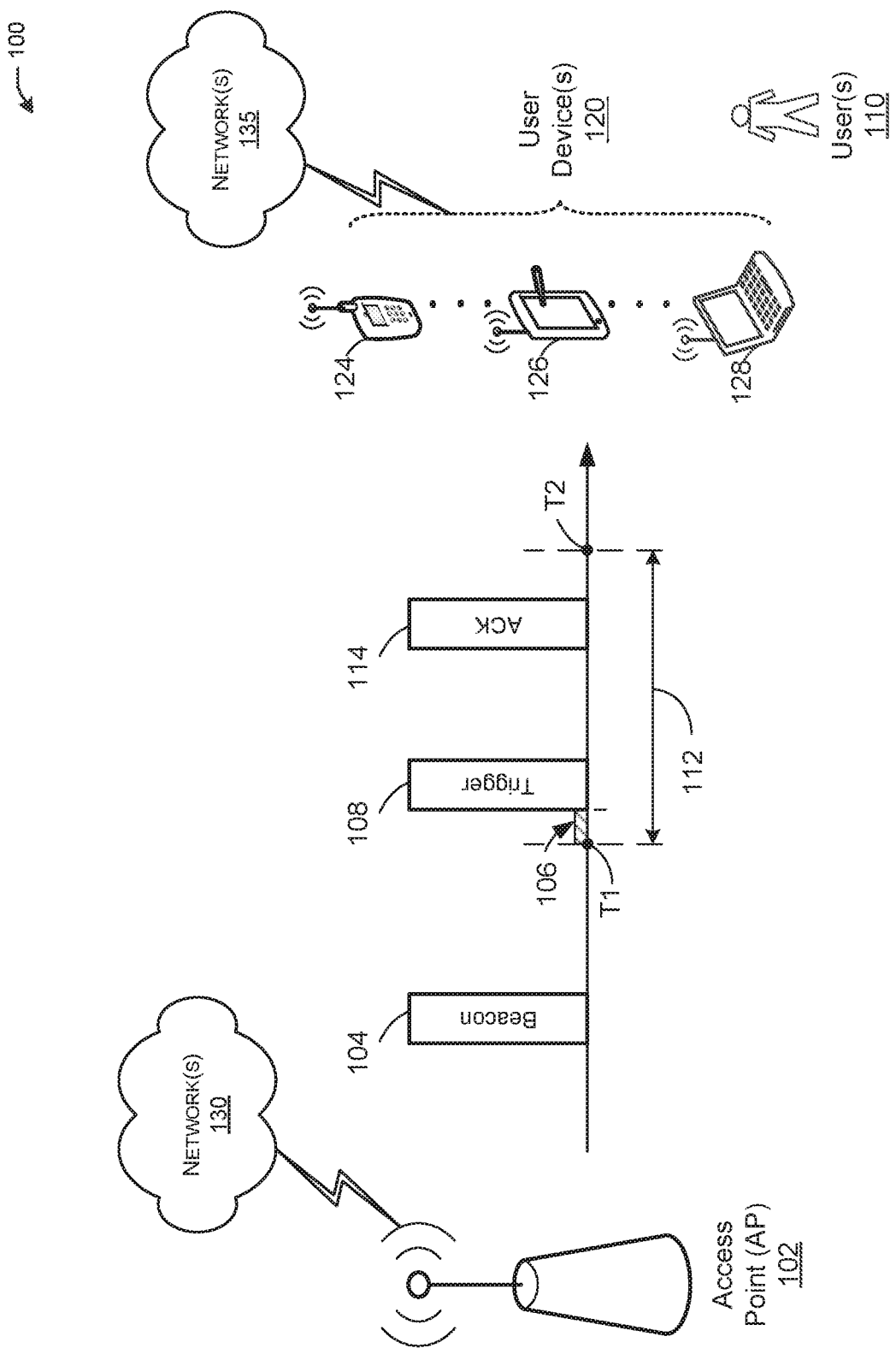
FIG. 1 depicts a network diagram illustrating an example network environment of a restrictive target wake time (TWT) service period (SP), in accordance with one or more example embodiments of the present disclosure.

Example embodiments described herein provide certain systems, methods, and devices for providing signaling to Wi-Fi devices in various Wi-Fi networks, including, but not limited to, IEEE 802.11ax (referred to as HE or HEW).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A design target for HEW is to adopt methods to improve the efficiency of Wi-Fi, and specifically the efficiency in dense deployments of Wi-Fi devices, such as in malls, conference halls, etc. HEW may use OFDMA techniques for channel access in the uplink and downlink directions. It is understood that the uplink direction is from a user device to an access point (AP), and the downlink direction is from an AP to one or more user devices. In the uplink direction, one or more user devices may be communicating with the AP and may be competing for channel access in a random channel access manner. In that case, the channel access in OFDMA may require coordination among the various user devices that may be competing to access the operating channel simultaneously. A trigger frame may consist of a preamble along with other signaling, such as resource allocation, to coordinate the uplink OFDMA operation. A trigger frame may be a frame that contains a preamble and other fields that may be sent from an AP informing all user devices serviced by the AP that channel access is available. A trigger frame may be sent in a medium access control (MAC) layer or in a physical (PHY) layer.

In HEW, user devices may communicate with other user devices and/or APs in a scheduled or unscheduled (random) manner. In the scheduled manner, an AP may allocate and assign network resources to the user devices in order to transmit their data. In the alternative, user devices may randomly access the operating channel to transmit their data. Utilizing the trigger frame of HEW, the AP may send either a trigger frame indicating that one or more user devices are assigned scheduled resource units, or may send a random access trigger frame indicating that the resource units are available in a random access manner, where the user devices randomly select one or more resource units. When a user device detects the trigger frame, it may use one of the one or more resource units associated with the trigger frame to send its uplink data. In order for an AP to notify the one or more user devices serviced by that AP that a trigger frame is coming, the AP may send a beacon frame specifying the first scheduled trigger frame. It is understood that a beacon frame is one of the management frames in IEEE 802.11 based wireless local area networks (WLANs). A beacon frame contains information about the network. Beacon frames may be transmitted periodically to announce the presence of a WLAN. Beacon frames are transmitted by the AP in an infrastructure basic service set (BSS).

An AP may send multiple trigger frames in one or more manners. The AP may schedule the trigger frames in an aperiodic cascaded sequence of trigger frames, a periodic cascaded sequence of trigger frames, or a random sequence of trigger frames. The aperiodic cascaded sequence of trigger frames may be where the AP sends the trigger frames one after the other in sequence. The periodic cascaded sequence of trigger frames may be where the AP sends the trigger frames at a specific time interval. The random sequence of trigger frames may be where the AP sends the trigger frames randomly between a first time period and a second time period. It is understood that the above descriptions are for purposes of illustration and are not meant to be limiting.

Target wake time (TWT) is a function that permits an AP to define a specific time or set of times for individual stations to access the transmission medium. The user devices and the AP exchange information that includes an expected activity duration to allow the AP to control the amount of contention and overlap among competing user devices. The use of TWT may be negotiated between an AP and a user device or may broadcasted by the AP to one or more user devices that may be associated or unassociated with the AP. TWT may be used to reduce network energy consumption, because user devices that use it can enter a doze state until their TWT service period (SP) arrives. User devices wake up (power on or become in an active state) during the allocated TWT SP and may be in a doze state (power off or become in an inactive state) outside of the TWT SP.

Power save (PS) devices may be devices such as an AP and/or user devices also may be referred to as stations (STAs). PS devices may utilize power saving modes in order to increase the efficiency and flexibility of data transmission. Specifically, the PS device may doze (go to an inactive state or power off) between packets to save power, while the AP buffers downlink frames that typically would have been sent to the PS device. The PS device and/or the AP determine the time when the PS device should wake up (go to an active state or power on) and receive data packets to maximize power conservation without sacrificing quality of service (QoS).

An AP may schedule transmission of a trigger frame to one or more PS devices during a TWT SP. The AP may set a bit (e.g., a cascade indication (CI)) in a cascaded field of a trigger frame in order to notify the one or more PS devices, whether additional trigger frames will be sent or whether the received trigger frame is the last trigger frame within the TWT SP. With the cascaded field set to 1 (e.g., CI=1), the AP may transmit additional trigger frames for UL data reception from the same or different PS devices within the TWT SP. However, if the cascaded field is set to 0 in a trigger frame, the PS devices receiving that trigger frame would be able to determine that the received trigger frame is the last trigger frame within the TWT SP. That is the trigger frame with a cascaded field set to 0 indicates the end of the trigger frame transmissions within the TWT SP.

However, there might be a potential issue with providing this flexibility to the AP in scheduling multiple trigger frames using the cascaded field. The issue is in terms of extending the TWT SP, if a cascaded trigger frame is scheduled very close to the end of the TWT SP. For example, the PS devices assigned resource units in a trigger frame will transmit UL PPDUs without taking into consideration the remaining duration of the TWT SP. However, PS devices that have set the network allocation vector (NAV) based on the indicated TWT SP (either in a beacon or in the first trigger frame of the SP) will reset their NAV and, on gaining channel access, might potentially collide with the UL PPDUs of the PS devices. It is understood that NAV is a virtual carrier sense, which is used by devices to reserve the medium for mandatory frames, which must follow the current frame.

Example embodiments of the present disclosure relate to systems, methods, and devices for a restrictive TWT SP. Specifically for limiting the allocation and transmission of trigger frames within a TWT SP in order to minimize collisions between uplink (UL) frames or other frames within a TWT SP.

In one embodiment, a restrictive TWT SP system may prohibit an AP from scheduling a trigger frame transmission close to the end of a TWT SP.

In another embodiment, a restrictive TWT SP system may set a cascade indication field within a trigger frame to be sent to one or more PS devices based at least in part on one or more conditions.

In another embodiment, a restrictive TWT SP system may determine one or more conditions associated with the duration of the TWT SP such that the trigger frame is sent to the one or more PS devices when the one or more conditions are met. The one or more conditions may be associated with determining a remaining duration of the TWT SP and comparing that to one or more durations associated with, at least in part, the trigger frame, one or more interframe space durations, one or more UL frame durations, and/or one or more acknowledgment durations.

In another embodiment, a restrictive TWT SP system may determine a last trigger frame to be sent to one or more PS devices based at least in part on the cascade indication field being sent to a predetermined value. For example, the AP may set the cascade indication field to 0 in the last trigger frame within the TWT SP.

In one embodiment, a restrictive TWT SP system may determine an acknowledgment policy bit associated with the quality of service (QoS) field of an uplink frame. For example, if the acknowledgment policy bit is set to 1, this may indicate that the AP may receive an acknowledgment from the one or more PS devices. However, if the acknowledgment policy bit is set to 0, this may indicate that the AP will not be receiving an acknowledgment from the one or more PS devices. That is, some communications may automatically be determined to not require acknowledgment, and some communications may be determined to always need acknowledgment. This may be based on, for example, a message type.

In one embodiment, a restrictive TWT SP system may ignore the acknowledgment policy bit based at least in part on the type of communication between the AP and the one or more PS devices.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 depicts a network diagram illustrating an example network environment of a restrictive target wake time (TWT) service period (SP), in accordance with one or more example embodiments of the present disclosure. Wireless network 100 may include one or more user devices 120 and one or more access point(s) (AP) 102, which may communicate in accordance with IEEE 802.11 communication standards, including IEEE 802.11ax. The user device(s) 120 may be mobile devices that are non-stationary (e.g., not having fixed locations) or may be stationary devices.

Figure 5:
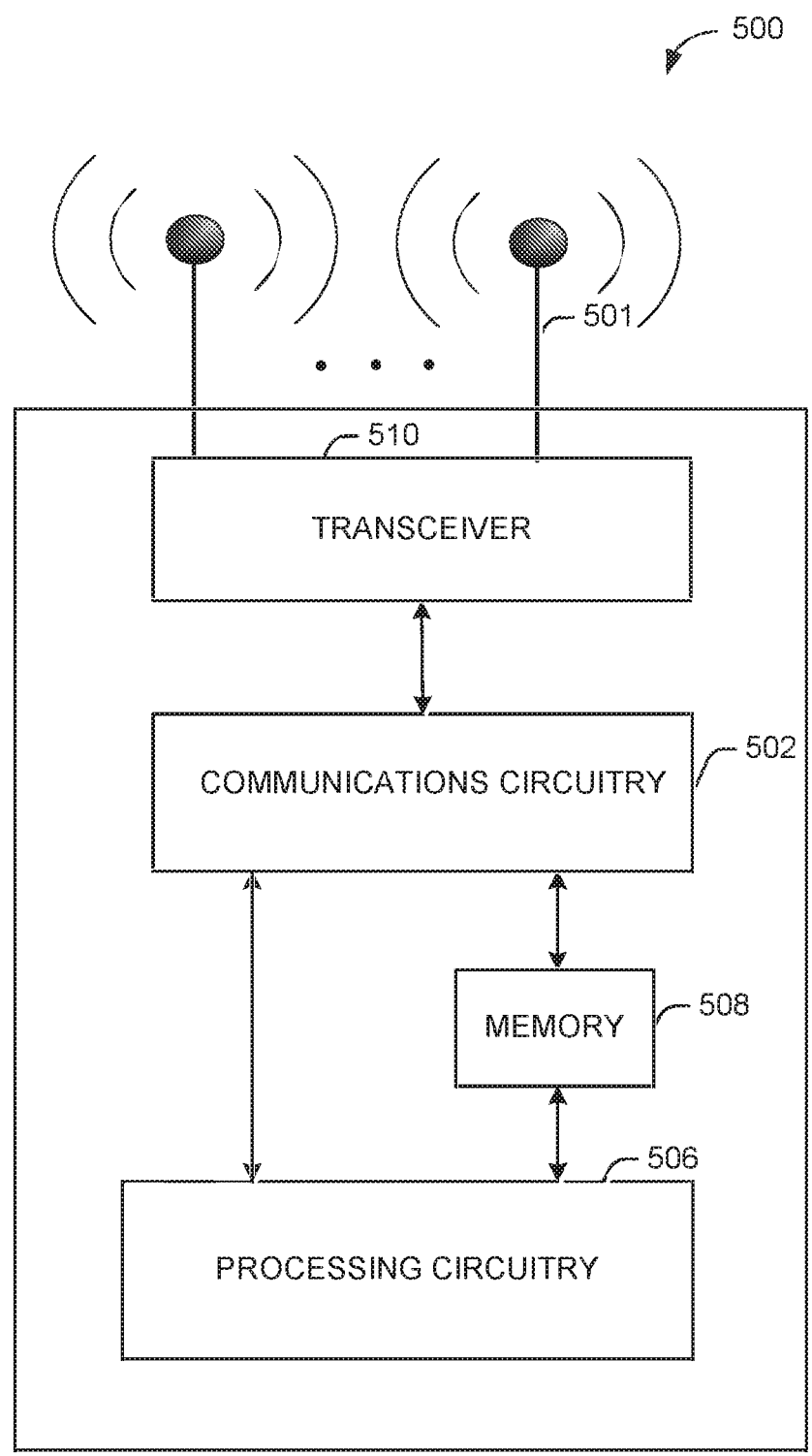
FIG. 5 illustrates a functional diagram of an example communication station that may be suitable for use as a user device, in accordance with one or more example embodiments of the present disclosure.
Figure 6:
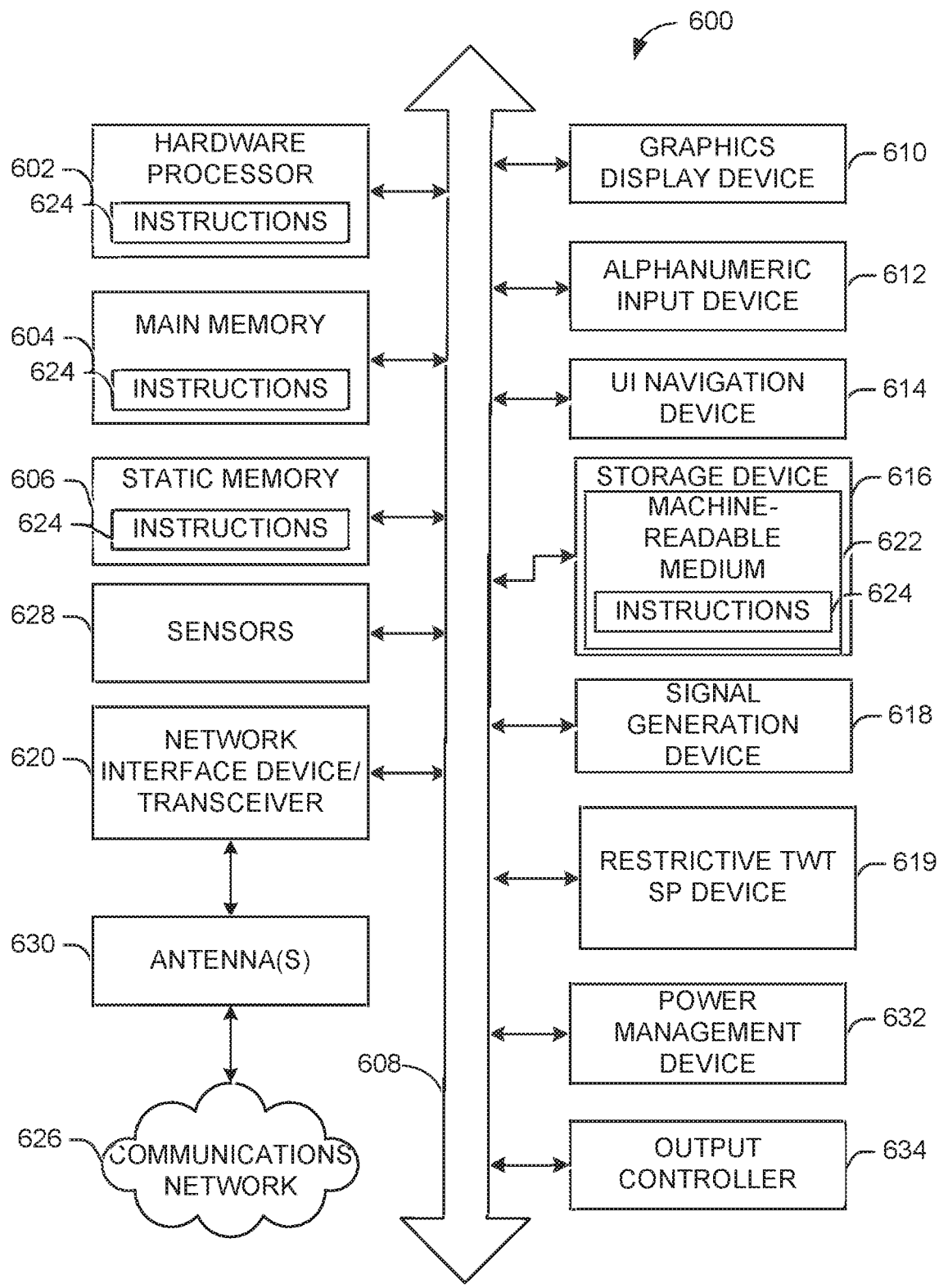
FIG. 6 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 5 and/or the example machine/system of FIG. 6.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP 102 may also include mesh stations in, for example, a mesh network, in accordance with one or more IEEE 802.11 standards.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, and/or 128), the AP 102 may communicate in a downlink direction and the user devices 120 may communicate with the AP 102 in an uplink direction by sending data frames in either direction. The data frames may be preceded by one or more preambles that may be part of one or more headers. These preambles may be used to allow a device (e.g., AP 102 and/or user devices 120) to detect a new incoming data frame from another device. A preamble may be a signal used in network communications to synchronize transmission timing between two or more devices (e.g., between the APs and the user devices).

During a communication between the AP 102 and one or more user devices 120, which may be PS devices, an AP may have already determined to send a beacon frame 104 to the one or more user devices 120 (e.g., user devices 124, 126, and/or 128). The beacon frame 104 may be used in order for an AP 102 to notify the one or more user devices 120 serviced by that AP 102 that a trigger frame may be transmitted, and the AP 102 may send a beacon frame 104 specifying one or more types of information included, at least in part in one or more information elements (IEs). For example, a target wake time (TWT) IE may be associated with a service period (SP), where the SP is a period of time that the one or more user devices 120 could come out of the doze state, that is when the one or more user devices 120 may wake up or power on or go into an active state, if needed. The beacon frame 104 may notify the one or more user devices 120, among other things, about when the SP starts (e.g., at time T1). The beacon frame 104 may also notify the one or more user devices 120 when, if any, trigger frame 108 will be sent out to the one or more user devices 120. The trigger frame 108 may also be utilized to poll the one or more user devices 120 to determine whether they have UL transmissions. The one or more user devices 120 may send their UL transmissions if they have any. After that, the AP 102 may respond to the one or more user devices 120 that send their UL transmissions by sending an acknowledgment (e.g., ACK 114). The acknowledgment may be a single ACK to each of the user devices 120 that sent UL transmissions, may be a block ACK, or may be a multi-user block ACK (MBA).

Figure 2:
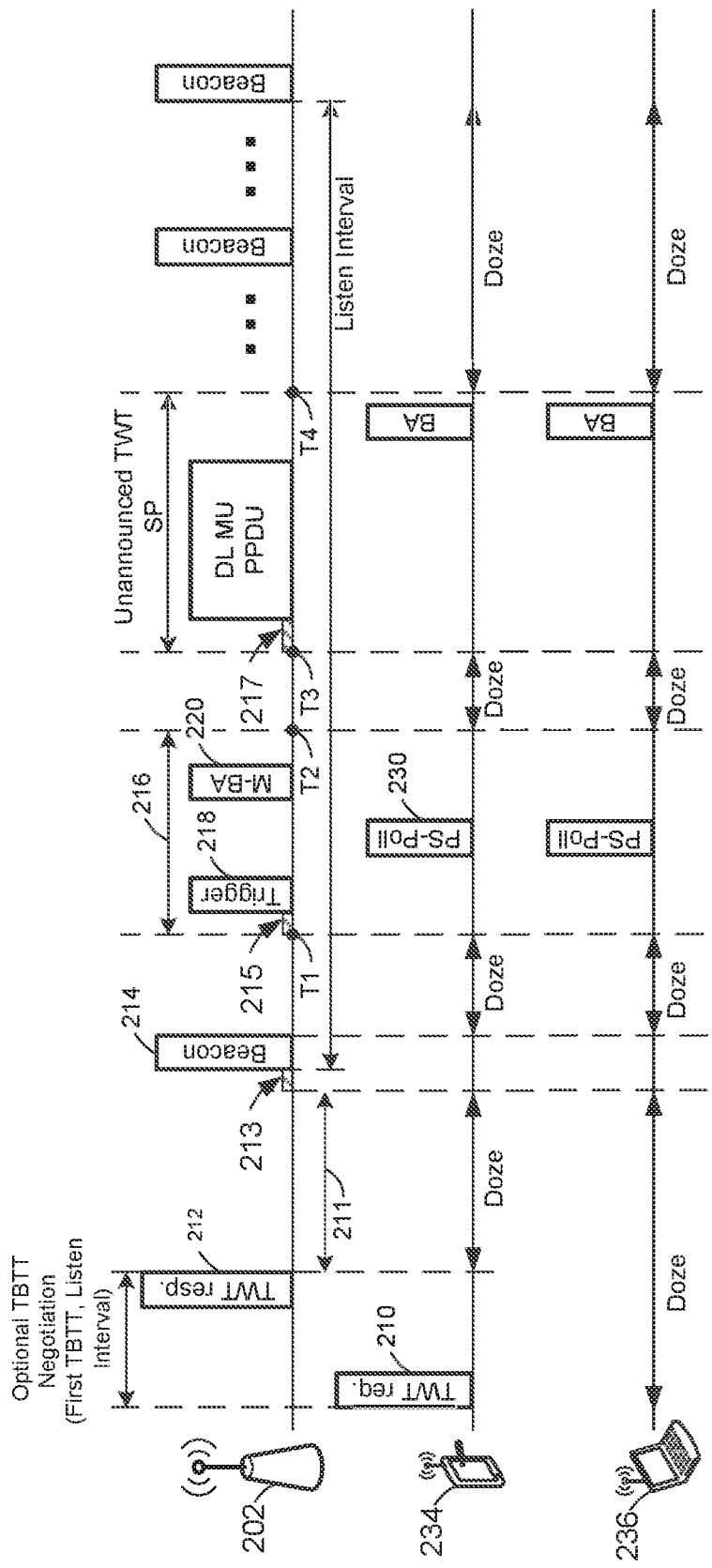
FIG. 2 depicts an illustrative schematic diagram of a broadcast target wake time (TWT) mechanism, in accordance with one or more example embodiments of the present disclosure.

FIG. 2 depicts an illustrative schematic diagram of a broadcast target wake time (TWT) mechanism, in accordance with one or more example embodiments of the present disclosure.

With reference to FIG. 2, the AP 202 and a user device 234 may begin the negotiation through an optional target beacon transmission time (TBTT) 211, where the TBTT 211 indicates when a beacon (e.g., beacon 214) may be sent by the AP 202. For example, the user device 234 may send a TWT request 210 and the AP 202 may reply with a TWT response 212. The TWT period may be established using negotiated TWT or broadcasted TWT mechanisms. A negotiated TWT mechanism may be negotiated between one or more user devices 120 (e.g., user devices 234 and 236) and an AP (e.g., AP 202), also referred to as an implicit TWT mechanism. A broadcasted TWT mechanism may be indicated by the AP 202 in a TWT information element (IE) indicated in a beacon 214. The beacon 214 may be sent after a channel access (e.g., channel access 213) after the TBTT 211.

After the optional TBTT negotiation, the user device 234, which initiated the TBTT negotiation, may enter into a doze state until after the target beacon transmission time TBTT 211. A doze state is understood to indicate that a PS device may enter a sleep mode or power off or go into an inactive state, if needed. As can be seen in FIG. 2, the user device 234 remains in a doze state after TBTT 211, after beacon 214, after TWT SP 216, after the unannounced TWT SP, etc. When the user device 234 is not in a doze state, the user device 234 may be in an awake state, powered on, or in an active state such that the user device 234 is capable of communicating and/or listening to communications with, at least in part, the AP 202 or one or more other PS devices.

FIG. 2 shows a negotiated TWT mechanism, where the AP 202 indicates the target trigger times for trigger frame transmissions in the beacon 214. Additionally, the AP 202 may indicate in the beacon 214 a target time (e.g., T1) as a start time of a TWT service period (SP) 216. Within the TWT SP 216, the AP 202 may transmit a trigger frame 218 to poll multi-user (MU) uplink (UL) transmissions from multiple PS user devices (e.g., user devices 234 and 236). In that case, the PS devices may send a PS poll frame (e.g., PS-Poll frame 230). In one example, the PS-Poll frame 230 may be used to inform the AP 202 of any uplink data that the user device may have. Following the UL transmissions that may be transmitted from one or more of the PS user devices, the AP 202 may send a multi-user block acknowledgment (BA) frame 220 acknowledging the UL transmissions received by the AP 202.

Moreover, the trigger frame 218 may be one of one or more cascaded trigger frames that may be sent by the AP 202 during the TWT SP 216. For example, the AP 202 may set a trigger field to 1 to indicate a trigger-enabled TWT. That is, one or more trigger frames may be sent by the AP. Otherwise, that AP 202 may set the trigger field to 0 to indicate a non-trigger enabled TWT. That is, only one trigger frame is sent by the AP. The AP 202 may schedule the transmission of one or more trigger frames intended for one or more PS devices (e.g., 234 and 236) during a trigger-enabled TWT SP (e.g. TWT SP 216). The AP 202 may intend to transmit additional trigger frames during a trigger-enabled TWT SP by setting a cascaded field included in the trigger frame 218 to 1 to indicate that it will transmit another trigger frame within the same TWT SP 216. Otherwise, the AP 202 may set the cascaded field to 0 to indicate the end of the trigger frame transmission and that the trigger frame containing the cascaded field having a value of 0 is the last trigger frame in the TWT SP 216.

However, with the cascaded field set to 1, the AP 202 may transmit multiple cascaded trigger frames for UL data reception from the same or from different SP devices within the trigger-enabled TWT SP (e.g., TWT SP 216). There may be problems with providing this flexibility to the AP in scheduling multiple trigger frames using the cascaded indication. Problems may arise, for example, when a trigger frame is scheduled for transmission close to the end of the TWT SP 216 (e.g., close to T2). The PS devices (e.g., user devices 234 and 236) assigned resource units (RUs) in this trigger frame may then transmit UL PLCP Protocol Data Units (PPDUs) after a short interframe space (SIFS). However, the PS devices that have set a network allocation vector (NAV) based on the indicated TWT SP (e.g. either in a beacon or in the first trigger frame of the SP) can reset their NAVs. After gaining channel access, they may collide with the UL PPDUs of other PS devices.

FIG. 2 also shows a scenario where an unannounced TWT SP may be scheduled by the AP 202 at time T3 and where the unannounced TWT SP ends at T4. In that case, the AP 202 may send, after a channel access delay 217, a downlink (DL) MU PPDU, which may be sent to the one or more PS devices (e.g., user devices 234 and/or 236) to communicate with these devices. A similar issue also occurs in the unannounced TWT SP where the one or more user devices may send their UL PPDU transmissions close to the end of the unannounced TWT SP. It is understood that the above descriptions are for purposes of illustration and are not meant to be limiting.

Figure 3:
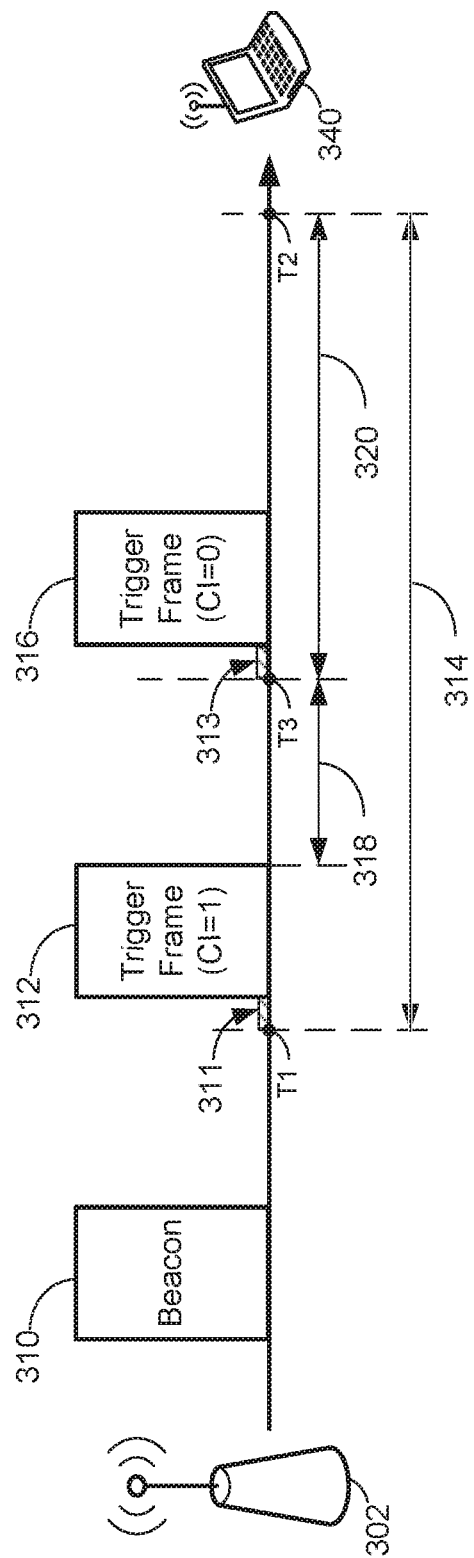
FIG. 3 depicts an illustrative schematic diagram of a restrictive TWT SP system, in accordance with one or more example embodiments of the present disclosure.

FIG. 3 depicts an illustrative schematic diagram of a restrictive TWT SP system, in accordance with one or more example embodiments of the present disclosure.

Referring to FIG. 3, there is shown an AP 302 that may be communicating with a PS device (e.g., user device 340). The AP 302 may send a beacon 310 to the user device 340. The beacon 310 may indicate, in this example, a first trigger frame 312 that may be sent at time T1. The trigger frame 312 may be sent to at least the user device 340. After a channel access delay 311, the beacon 310 may contain a TWT IE that may be utilized to indicate the type of TWT mechanism (e.g., broadcasted or negotiated TWT mechanism) to be used and/or the trigger frame 312 transmission time (e.g., T1), among other possible information related to the one or more trigger frames.

As depicted in FIG. 3, if the AP 302 determines that cascaded trigger frames will be sent to the user devices (e.g., user device 340), the AP 302 may set the cascade indication (CI) field to 1 in the trigger frame 312. When the user device 340 receives the trigger frame 312, the user device 340 may decode the trigger frame 312 and extract the cascade indication, which, in this example, is equal to 1. The user device 340 may determine that additional trigger frames may be sent by the AP 302 based on that cascade indication. The AP 302 may schedule a next trigger frame 316 in one or more cascaded trigger frames. If the trigger frame 316 is the last trigger frame in the cascaded trigger frames, the AP 302 may set the cascade indication to 0 in the trigger frame 316 in order to indicate that it is the last trigger frame within the TWT SP 314. The TWT SP 314 may have a starting time (e.g., T1) and an end time (e.g., T2). Each trigger frame may possibly trigger a response from the user device (e.g., user device 340) receiving the trigger frame. Therefore, in at least one embodiment of the present disclosure, the AP 302 may determine the remaining duration of the TWT SP 314 before scheduling a next trigger frame in order to ensure there is enough time to send the last trigger frame, and receive expected responses from the user device before the expiration of the TWT SP 314.

A cascaded trigger frame (e.g., trigger frame 316) may be sent by the AP 302 close to the end of the duration of the TWT SP 314 (e.g., close to T2). This may occur even though there may not be enough time for UL MU PPDU transmissions and acknowledge/block acknowledgment (ACK/BA) transmissions within the allocated TWT SP 314. If TWT SP 314 is extended beyond the interval indicated in the TWT IE, the user devices (e.g., user device 340) that do not access the channel within the TWT SP 314 may reset their respective NAVs. The chances of collision are thereby increased due to the hidden terminal problem of user devices involved in UL MU PPDUs and user devices attempting channel access through contention. Hence, the TWT SP 314 may not be extended beyond the indicated TWT SP.

In one embodiment, an AP (e.g., AP 302) may be prohibited from scheduling a trigger frame (e.g., trigger frame 316) close to the end of the TWT SP (e.g., close to T2). That is, an AP may refrain from sending a trigger frame, if the trigger frame is within a certain threshold from the end of the TWT SP. For example, in the case of cascaded trigger frames where one or more trigger frames (e.g., trigger frames 312 and 316) may be sent by the AP to one or more user devices (e.g., user device 340), the AP may set the cascade indication bit to 1 in the first trigger frame (e.g., trigger frame 312) in order to indicate to the user devices that other trigger frames may also be transmitted. However, if the AP determines that another trigger frame (e.g., trigger frame 316) in the cascaded trigger frames will be sent within a threshold time from the end time of the TWT SP, the AP may refrain from sending that trigger frame and may set the cascade indication to 0 in the current trigger frame before sending it to the user devices.

In one embodiment, the AP (e.g., a high efficiency (HE) AP such as AP 302) may set the cascade indication field to "1" in a current trigger frame if a predetermined condition is satisfied. That is, if the AP 302 determines that there is enough time to send the last trigger frame (e.g., trigger frame 316) and still be able to send and receive expected frames during the TWT SP 314.

In one embodiment, the AP may determine acknowledgment policy settings before setting the cascade indication in a trigger frame of the cascaded trigger frames. For example, the AP may determine the value of the ACK policy subfield within a QoS control field in the UL PPDU. That is, the AP 302 may determine if a value in the ACK policy subfield has been set to a value to indicate an immediate ACK/BA (to indicate that an ACK/BA may be expected from at least one of the user devices) within the QoS control field in the UL PPDUs before determining whether to set the cascade indication in the trigger frame. For example, the value may be "01," or any other value. In a case where the ACK policy subfield is set to immediate ACK/BA, the predetermined condition must be satisfied before setting the cascade indication to 1. It should be understood that there are UL or DL transmissions and an ACK prior to the transmission of the second (cascaded) trigger frame (e.g., trigger frame 316). In other words, trigger frame 316 may not be transmitted after another trigger frame (e.g., trigger frame 312) unless the predetermined condition is satisfied. After the trigger frame 312, in a UL MU operation the user devices may send their UL data to the AP, followed by a multi-user BA (MBA) from the AP. The predetermined condition takes into account the UL data and the MBA durations before sending the trigger frame 316.

In a DL MU operation (e.g., AP sending data to user devices), the trigger frame 312 may be aggregated with MU DL data for multiple user devices, followed by UL MU ACK from the user devices. The predetermined condition takes into account these durations before sending the trigger frame 316.

After such an UL or DL MU operation, the second (cascaded) trigger frame 316 may be transmitted by the AP. Therefore, the remaining time may be computed from the end of the ACK transmission (in either UL or DL MU operation) (e.g., time T3) to the end of the TWT SP (e.g., time T2).

The predetermined condition may be that the remaining duration of the trigger-enabled TWT SP be greater than or equal to the sum of the cascaded trigger frame (e.g., trigger frame 316) duration, the SIFS (e.g., SIFS 313), the UL or DL PPDU length, an additional SIFS, and the ACK/BA(e.g., duration 318). In this case, the predetermined condition accounts for expected frames that may be sent and/or received by the AP during the TWT SP 314. For example, the predetermined condition takes into consideration channel access times, such as SIFS, before each frame to be sent by the AP, and takes into consideration the duration of the frames (e.g., trigger frame 316, UL or DL PPDU, ACK/BA/MBA, etc.). This provides an enhanced TWT SP such that collisions are minimized, in case frames are received outside the TWT SP.

In another embodiment, if the ACK policy subfield is set to 00 (indicating no immediate ACK/BA), the AP 302 may determine whether to set the cascade indication to 1, if the remaining duration of TWT SP 314 is greater than or equal to the sum of the cascaded trigger frame (e.g., trigger frame 316) duration, the SIFS duration, and the UL PPDU length. It should be understood that although the value 00 is chosen to indicate no immediate ACK/BA, it is only for illustrative purposes and other values may be selected to indicate no immediate ACK/BA. In the alternative, if the AP 302 determines that the remaining duration of the TWT SP 314 is less than the sum of the trigger frame 316 duration, the SIFS duration and the UL PPDU duration, the AP 302 may set the cascade indication to 0.

In another embodiment, the AP (e.g., a high efficiency (HE) AP) may set the cascade indication bit to 0 in the last trigger frame within the TWT SP 314. That is, when the AP is done sending trigger frames in a series of cascaded trigger frames within the TWT SP 314, the AP may set the last trigger frame to have a cascade indication bit of 0, informing the user devices receiving the trigger frames from the AP 302 that this is the last trigger frame.

In another embodiment, if the ACK policy bit is ignored, such that UL PPDUs are always acknowledged by sending acknowledgments (e.g., ACK/BA/MBA), the AP may set the cascade indication bit to 1 in a current trigger frame if the following condition is satisfied: the remaining duration of the trigger-enabled TWT SP is greater than or equal to the sum of the cascaded trigger frame duration (e.g., trigger frame 316), the SIFS, the UL PPDU length, and the ACK/BA. For example, if the AP determines that the remaining duration 320 is greater than the sum of the duration of the expected frames that may be allocated and/or received within the TWT SP 314, the AP may refrain from sending the trigger frame.

Figure 4A:
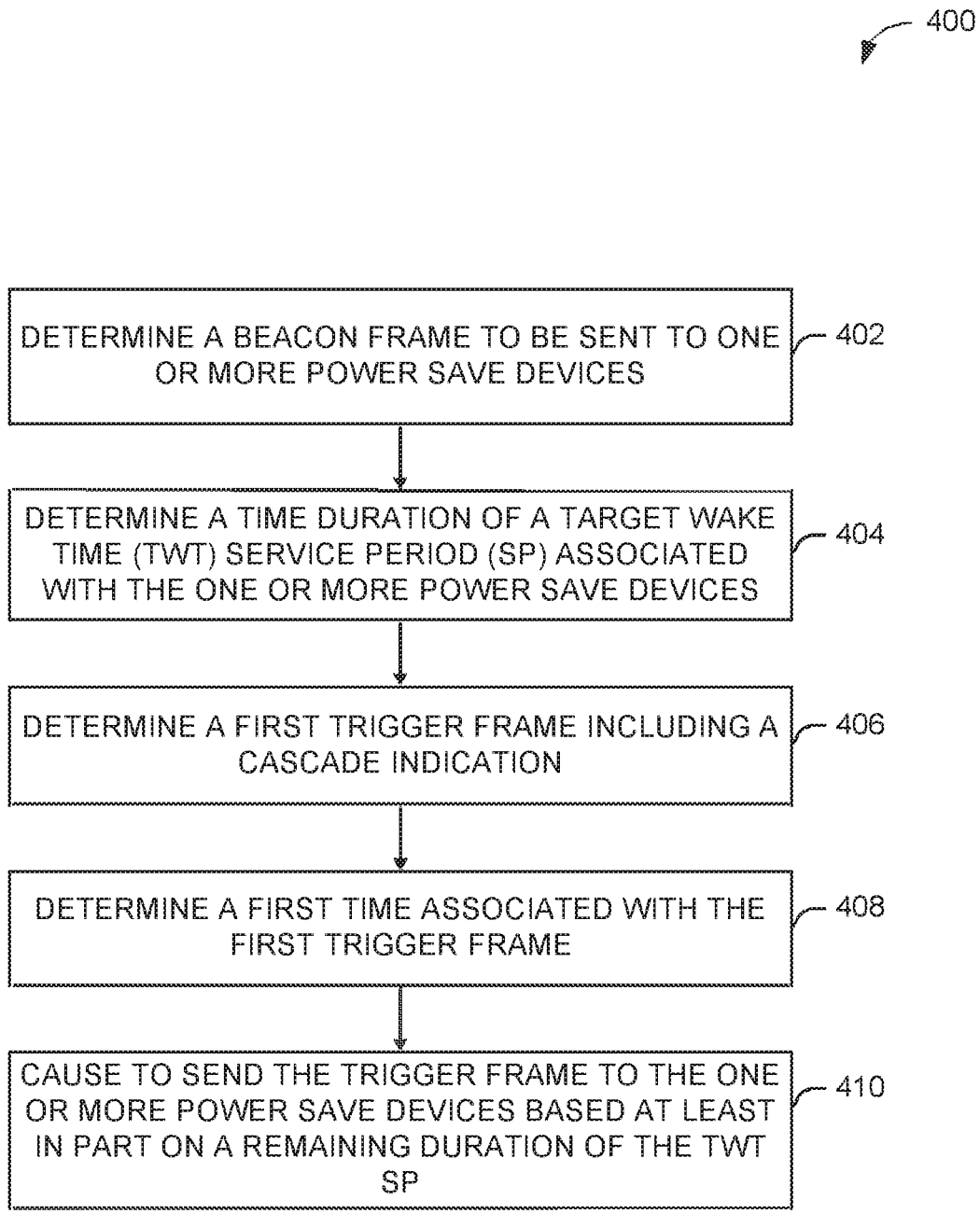
FIG. 4A depicts a flow diagram of an illustrative process of a restrictive TWT SP system, in accordance with one or more example embodiments of the present disclosure.

FIG. 4A illustrates a flow diagram of an illustrative process 400 for an illustrative restrictive TWT SP system, in accordance with one or more example embodiments of the present disclosure.

At block 402, a device (e.g., the user device(s) 120 and/or the AP 102 of FIG. 1) may determine a beacon frame to be sent to one or more power save devices (e.g., user device(s) 120). As explained above, the TWT may be established using either a negotiated TWT mechanism or a broadcasted TWT mechanism. In the negotiated TWT mechanism, for example, an optional TBTT negotiation between the AP and one or more user devices may be performed in order to determine the details of a TWT SP such that the one or more user devices are able to send and receive transmissions and enter into a doze state or inactive state. During the optional TBTT negotiation, a user device may send a TWT request to the AP, and the AP may respond with a TWT response. The TWT response may contain information of a target time for the transmission of a first beacon from the AP. The beacon may contain information associated with a time duration for when the user device should wake up in order to transmit frames to the AP.

At block 404, the device may determine a time duration of a target wake time (TWT) service period (SP) associated with the one or more power save devices (e.g., user device(s) 120). The beacon may contain, but is not limited to, the duration of the TWT SP, the beginning time of the TWT SP, and the end time of the TWT SP. The user device may decode the beacon and/or extract this information in order to determine when to transmit one or more of its uplink frames, such as UL PPDU and/or acknowledgments.

At block 406, the device may determine a first trigger frame including a cascade indication. For example, the AP may set a cascade indication to either a 1 or a 0 based at least in part on whether additional trigger frames will be sent to the one or more user devices. If the AP determines that an additional trigger frame will be sent, the AP may set the cascade indication in the first trigger frame to 1. However, if the AP determines that only one trigger frame is to be sent, the AP may set the cascade indication to 0. In the same sense, the AP may set the cascade indication to 0 in the trigger frame to be sent as the last trigger frame within the TWT SP.

At block 408, the device may determine a first time associated with the first trigger frame. For example, the AP may determine the time when the first trigger frame will be sent to the one or more user devices. The AP may use that determination in order to send the trigger frame at that time. The user device may then receive the trigger frame, and may determine whether additional trigger frames are expected based at least in part on determining the value of the cascade indication that is set in the received trigger frame.

At block 410, the device may cause to send the trigger frame to the one or more power save devices based at least in part on a remaining duration of the TWT SP. For example, the AP may determine whether to send a trigger frame based at least in part on the remaining duration of the TWT SP. The AP may be prohibited from scheduling a trigger frame close to the end of the TWT SP. That is, an AP may refrain from sending a trigger frame, if the trigger frame is within a certain threshold from the end of the TWT SP.

The AP may set the cascade indication field to "1" in a current trigger frame indicating a transmission of an additional trigger frame after the current trigger frame may be expected, if a predetermined condition is satisfied. That is, if the AP determines that there is enough time to send the last trigger frame and still be able to send and receive expected frames during the TWT SP 314.

The AP may determine an acknowledgment policy setting before setting the cascade indication in a trigger frame of the cascaded trigger frames. For example, the AP may determine the value of the ACK policy subfield within a QoS control field in the UL PPDU. That is, the AP may determine if a value in the ACK policy subfield has been set to "01" before determining whether to set the cascade indication in the trigger frame. In the case where the ACK policy subfield is set to 01, the predetermined condition that must be satisfied before setting the cascade indication to 1 may be that the remaining duration of the trigger-enabled TWT SP be greater than or equal to the sum of the cascaded trigger frame duration, the SIFS, the UL PPDU length, an additional SIFS, and the ACK/BA. In this case, the predetermined condition accounts for expected frames that may be sent and/or received by the AP during the TWT SP. This provides an enhanced TWT SP such that collisions are minimized, in case frames are received outside the TWT SP.

If the ACK policy subfield is set to 00 (indicating no immediate ACK/BA), the AP may determine whether to set the cascade indication to 1, if the remaining duration of the TWT SP is greater than or equal to the sum of the cascaded trigger frame duration, the SIFS duration, and the UL PPDU length. It should be understood that although the value 00 is chosen to indicate no immediate ACK/BA, it is only for illustrative purposes and other values may be selected to indicate no immediate ACK/BA. In the alternative, if the AP determines that the remaining duration of the TWT SP is less than the sum of the trigger frame 316 duration, the SIFS duration and the UL PPDU duration, the AP 302 may set the cascade indication to 0 indicating that the current trigger frame is the last trigger frame within the TWT SP.

If the ACK policy bit is ignored, such that UL PPDUs are always acknowledged by sending acknowledgments (e.g., ACK/BA/MBA), the AP may set the cascade indication bit to 1 in a current trigger frame if the following condition is satisfied: the remaining duration of the trigger-enabled TWT SP is greater than or equal to the sum of the cascaded trigger frame duration, the SIFS, the UL PPDU length, an additional SIFS, and the ACK/BA. For example, if the AP determines that the remaining duration is greater than the sum of the duration of expected frames that may be allocated and/or received within the TWT SP, the AP may refrain from sending the trigger frame. It is understood that the above descriptions are for purposes of illustration and are not meant to be limiting.

Figure 4B:
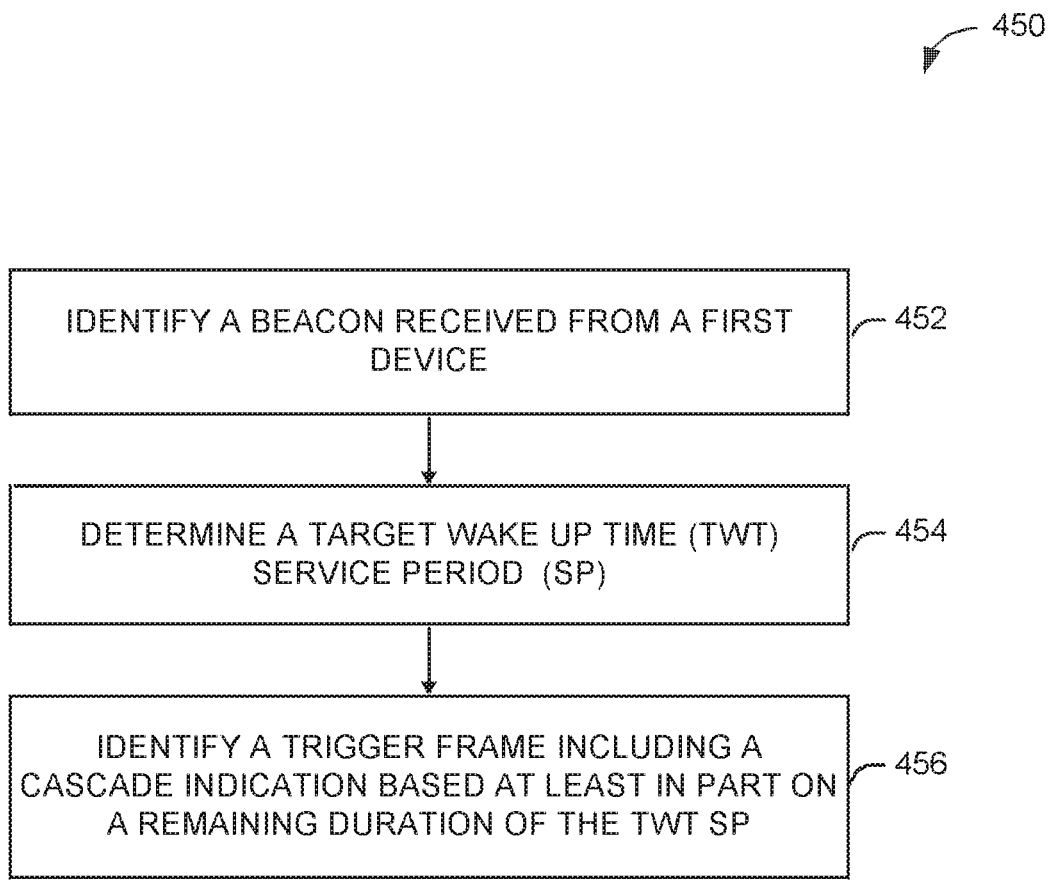
FIG. 4B depicts a flow diagram of an illustrative process of a restrictive TWT SP system, in accordance with one or more example embodiments of the present disclosure.

FIG. 4B illustrates a flow diagram of an illustrative process 450 for an illustrative restrictive TWT SP system, in accordance with one or more example embodiments of the present disclosure.

At block 452, a device (e.g., the user device(s) 120 and/or the AP 102 of FIG. 1) may identify a beacon received from a first device (e.g., an AP). For example, a user device (e.g., a power device) may receive the beacon from an AP. The user device may decode and/or extract information from the received beacon. For example, the information may be associated with a time duration for when the user device should wake up in order to transmit frames to the AP.

At block 454, the device may determine a target wake time (TWT) service period (SP). For example, the user device may extract the TWT SP in order to determine a beginning time and an end time of the TWT SP. This information allows the user device to determine when to wake up (power on) in order to transmit one or more frames, such as UL PPDU and acknowledgment frames.

At block 456, the device may identify a trigger frame including a cascade indication based at least in part on a remaining duration of the TWT SP. For example, the AP may have included information in the beacon on when the first trigger frame should be expected by the user device. The user device may be in an inactive mode until that time. The user device may then go into an active mode in order to receive and identify the first trigger frame. This trigger frame may include additional information such as a cascade indication bit. The user device may extract the cascade indication to determine whether additional trigger frames should be expected. For example, if the cascade indication was determined to be equal to 0, then the user device may determine that this trigger frame is the last trigger frame. However, if the user device determines that the cascade indication was equal to 1, then the user device may determine that, at a minimum, an additional trigger frame may be expected. It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 2-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a restrictive TWT SP device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600.

In an example, one or any combination of the hardware processor 602, the main memory 604, the static memory 606, or the storage device 616 may constitute machine-readable media.

The restrictive TWT SP device 619 may carry out or perform any of the operations and processes (e.g., the processes 400 and 450) described and shown above. For example, the restrictive TWT SP device 619 may be configured to limit the allocation and transmission of trigger frames within a TWT SP in order to minimize collisions between uplink (UL) frames or other frames within a TWT SP.

The restrictive TWT SP device 619 may prohibit an AP from scheduling a trigger frame transmission close to the end of a TWT SP.

The restrictive TWT SP device 619 may set a cascade indication field within a trigger frame to be sent to one or more PS devices based at least in part on one or more conditions.

The restrictive TWT SP device 619 may determine the one or more conditions associated with the duration of the TWT SP such that the trigger frame is sent to the one or more PS devices when the one or more conditions are met. The one or more conditions may be associated with determining a remaining duration of the TWT SP and comparing that to one or more durations associated with, at least in part, the trigger frame, one or more interframe space durations, one or more UL frame durations, and/or one or more acknowledgment durations.

The restrictive TWT SP device 619 may determine a last trigger frame to be sent to one or more PS devices based at least in part on the cascade indication field being sent to a predetermined value. For example, the AP may set the cascade indication field to 0 in the last trigger frame within the TWT SP.

The restrictive TWT SP device 619 may determine an acknowledgment policy bit associated with the QoS field of an uplink frame. For example, if the acknowledgment policy bit is set to 1, this may indicate that the AP may receive an acknowledgment from the one or more PS devices. However, if the acknowledgment policy bit is set to 0, this may indicate that the AP will not be receiving an acknowledgment from the one or more PS devices.

The restrictive TWT SP device 619 may ignore the acknowledgment policy bit based at least in part on the type of communication between the AP and the one or more PS devices.

It is understood that the above actions are only a subset of what the restrictive TWT SP device 619 may be configured to perform and that other functions included throughout this disclosure may also be performed by the restrictive TWT SP device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include at least one memory that stores computer-executable instructions; and at least one processor configured to access the at least one memory, wherein the at least one processor is configured to execute the computer-executable instructions to: determine a beacon frame to be sent to one or more power save devices; determine a time duration of a target wake time (TWT) service period (SP) associated with the one or more power save devices; determine a first trigger frame including a cascade indication; determine a first time associated with the first trigger frame; and cause to send the trigger frame to the one or more power save devices based at least in part on a remaining duration of the TWT SP.

The implementations may include one or more of the following features. The cascade indication is set to 1 to indicate an additional trigger frame transmission within the TWT SP. The cascade indication is set to 0 to indicate a last trigger frame transmission within the TWT SP. The at least one processor may be further configured to execute the computer-executable instructions to: determine an acknowledgment policy associated with a quality of service (QoS) field of the UL PPDU is set to a first value indicating an immediate acknowledgment; set the cascade indication to 1 when the remaining duration is greater than or equal to a sum of two or more of a trigger frame duration, a short interfame space (SIFS) duration, an uplink (UL) MU Physical Layer Convergence Protocol PLCP Protocol Data Unit (PPDU) duration, an additional SIFS duration, and an acknowledgment duration; and set the cascade indication to 0 when the remaining duration is less than the sum. The at least one processor may be further configured to execute the computer-executable instructions to: determine an acknowledgment policy associated with a quality of service (QoS) field of the UL PPDU is set to a second value; set the cascade indication to 1 when the remaining duration of the TWT SP is greater than or equal to a sum of a cascaded trigger frame duration, a short interfame space (SIFS) duration, and an uplink (UL) multi-user (MU) Physical Layer Convergence Protocol PLCP Protocol Data Unit (PPDU) duration; and set the cascade indication to 0 when the remaining duration of the TWT SP is less than the sum. The first time associated with the first trigger frame is a time when the first trigger frame is to be sent to at least one of the one or more power save devices. The remaining duration of the TWT SP is a difference between a TWT SP end time and an end time associated with an end of an uplink or downlink multi-user operation solicited by the first trigger frame. The first trigger frame is at least one of a cascaded trigger frame or a non-cascaded trigger frame. The acknowledgment duration is at least one of a device acknowledgment (ACK) duration, a block acknowledgment (BA) duration, or a multi-device block acknowledgment (MBA) duration. The device may further include a transceiver configured to transmit and receive wireless signals. The device may further include at least one antenna coupled to the transceiver.

According to example embodiments of the disclosure, there may be a non-transitory computer-readable medium storing computer-executable instructions which, when executed by a processor, cause the processor to perform operations. The operations may include identifying a beacon received from a first device; determining a target wake time (TWT) service period (SP); and identifying a trigger frame including a cascade indication based at least in part on a remaining duration of the TWT SP.

The implementations may include one or more of the following features. The cascade indication is set to 1 to indicate an additional trigger frame transmission within the TWT SP. The cascade indication is set to 0 to indicate a last trigger frame transmission within the TWT SP. The remaining duration of the TWT SP is a difference between an end time of the TWT SP and a first time when the trigger frame is to be sent by the first device. The trigger frame is at least one of a cascaded trigger frame or a non-cascaded trigger frame. The remaining duration of the TWT SP is greater than or equal to a sum of two or more of a trigger frame duration, a short interframe space (SIFS) duration, an uplink (UL) physical layer convergence protocol PLCP protocol data unit (PPDU) duration, and an acknowledgment duration, when an acknowledgment policy associated with a quality of service (QoS) field of the UL PPDU is set to 1. The acknowledgment duration is at least one of a device acknowledgment (ACK) duration, a block acknowledgment (BA) duration, or a multi-device block acknowledgment (MBA) duration.

According to example embodiments of the disclosure, there may include a method. The method may include determining a beacon frame to be sent to one or more power save devices; determining a time duration of a target wake time (TWT) service period (SP) associated with the one or more power save devices; determining a first trigger frame including a cascade indication; determining a first time associated with the first trigger frame; and causing to send the trigger frame to the one or more power save devices based at least in part on a remaining duration of the TWT SP.

The implementations may include one or more of the following features. The cascade indication is set to 1 to indicate an additional trigger frame transmission within the TWT SP. The cascade indication is set to 0 to indicate a last trigger frame transmission within the TWT SP. The method may further include determining an acknowledgment policy associated with a quality of service (QoS) field of the UL PPDU is set to a first value indicating an immediate acknowledgment; setting the cascade indication to 1 when the remaining duration is greater than or equal to a sum of two or more of a trigger frame duration, a short interframe space (SIFS) duration, an uplink (UL) MU Physical Layer Convergence Protocol PLCP Protocol Data Unit (PPDU) duration, the SIFS duration, and an acknowledgment duration; and setting the cascade indication to 0 when the remaining duration is less than the sum. The method may further include: determining an acknowledgment policy associated with a quality of service (QoS) field of the UL PPDU is set to a second value; setting the cascade indication to 1 when the remaining duration of the TWT SP is greater than or equal to a sum of a cascaded trigger frame duration, a short interframe space (SIFS) duration, and an uplink (UL) multi-user (MU) Physical Layer Convergence Protocol PLCP Protocol Data Unit (PPDU) duration; and setting the cascade indication to 0 when the remaining duration of the TWT SP is less than the sum. The first time associated with the first trigger frame is a time when the first trigger frame is to be sent to at least one of the one or more power save devices. The remaining duration of the TWT SP is a difference between a TWT SP end time and an end time associated with an end of an uplink or downlink multi-user operation solicited by the first trigger frame. The first trigger frame is at least one of a cascaded trigger frame or a non-cascaded trigger frame. The acknowledgment duration is at least one of a device acknowledgment (ACK) duration, a block acknowledgment (BA) duration, or a multi-device block acknowledgment (MBA) duration.

In example embodiments of the disclosure, there may be an apparatus. The apparatus may include means for determining a beacon frame to be sent to one or more power save devices. The apparatus may include means for determining a time duration of a target wake time (TWT) service period (SP) associated with the one or more power save devices. The apparatus may include means for determining a first trigger frame including a cascade indication. The apparatus may include means for determining a first time associated with the first trigger frame. The apparatus may include means for causing to send the trigger frame to the one or more power save devices based at least in part on a remaining duration of the TWT SP.

The implementations may include one or more of the following features. The cascade indication is set to 1 to indicate an additional trigger frame transmission within the TWT SP. The cascade indication is set to 0 to indicate a last trigger frame transmission within the TWT SP. The apparatus may further include: means for determining an acknowledgment policy associated with a quality of service (QoS) field of the UL PPDU is set to a first value indicating an immediate acknowledgment; means for setting the cascade indication to 1 when the remaining duration is greater than or equal to a sum of two or more of a trigger frame duration, a short interframe space (SIFS) duration, an uplink (UL) MU Physical Layer Convergence Protocol PLCP Protocol Data Unit (PPDU) duration, the SIFS duration, and an acknowledgment duration; and means for setting the cascade indication to 0 when the remaining duration is less than the sum. The apparatus may further comprise: means for determining an acknowledgment policy associated with a quality of service (QoS) field of the UL PPDU is set to a second value; means for setting the cascade indication to 1 when the remaining duration of the TWT SP is greater than or equal to a sum of a cascaded trigger frame duration, a short interframe space (SIFS) duration, and an uplink (UL) multi-user (MU) Physical Layer Convergence Protocol PLCP Protocol Data Unit (PPDU) duration; and means for setting the cascade indication to 0 when the remaining duration of the TWT SP is less than the sum. The first time associated with the first trigger frame is a time when the first trigger frame is to be sent to at least one of the one or more power save devices. The remaining duration of the TWT SP is a difference between a TWT SP end time and an end time associated with an end of an uplink or downlink multi-user operation solicited by the first trigger frame. The first trigger frame is at least one of a cascaded trigger frame or a non-cascaded trigger frame. The acknowledgment duration is at least one of a device acknowledgment (ACK) duration, a block acknowledgment (BA) duration, or a multi-device block acknowledgment (MBA) duration.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for scheduling target wake times for station devices, the device comprising processing circuitry coupled to storage, the processing circuitry configured to:
    determine a target wake time of a target wake time service period for a station device, wherein the target wake time occurs after a first beacon sent by the device and before a second beacon sent by the device, wherein the first beacon and the second beacons are consecutive beacons, wherein the target wake time occurs after the station device receives the first beacon and after the station device enters a first doze state after receiving the first beacon, and wherein the first doze state ends before the station device enters a second doze state before waking up and receiving the second beacon from the device;
    cause to send the first beacon to one or more station devices, the first beacon comprising an indication of the target wake time; and
    cause to send one or more trigger frames during the target wake time service period.

2. The device of claim 1, wherein the first doze state occurs between a first trigger frame and a second trigger frame of the one or more trigger frames.

3. The device of claim 1, wherein the target wake time service period is periodic.

4. The device of claim 1, wherein the one or more trigger frames comprise a first trigger frame, and wherein the first trigger frame comprises an indication that the first trigger frame is the last trigger frame of the target wake time service period.

5. The device of claim 1, wherein the processing circuitry is further configured to identify a poll received from a station device of the one or more station devices before sending the one or more trigger frames, wherein the poll indicates that the station device is awake from the first doze state that began after the first beacon.

6. The device of claim 1, further comprising a transceiver configured to transmit and receive wireless signals, wherein the wireless signals comprise at least one of the first beacon or the one or more trigger frames.

7. The device of claim 6, further comprising at least one antenna coupled to the transceiver.

8. A non-transitory computer-readable medium storing computer-executable instructions which when executed by one or more processors result in performing operations comprising:
- identifying, at a first device, a first beacon received from a second device, the first beacon comprising an indication of a target wake time that occurs after the first device enters a first doze state after receiving the first beacon, and ends before the first device enters a second doze state before receiving a second beacon from the second device, wherein the first beacon and the second beacon are consecutive beacons;
- determining that the first device is to wake from the first doze state based on the target wake time;
- causing the first device to enter the first doze state after receiving the first beacon;
- causing the first device to wake from the first doze state at the target wake time;
- identifying one or more trigger frames received from the second device;
- causing the first device to enter the second doze state after receiving the one or more trigger frames;
- causing the first device to wake from the second doze state; and
- identifying the second beacon received from the second device.

9. The non-transitory computer-readable medium of claim 8, the operations further comprising determining that the target wake time service period is periodic.

10. The non-transitory computer-readable medium of claim 8, the operations further comprising determining that the target wake time service period is aperiodic.

11. The non-transitory computer-readable medium of claim 8, wherein the one or more trigger frames comprise a first trigger frame, and wherein the first trigger frame comprises an indication that the first trigger frame is the last trigger frame of the target wake time service period.

12. The non-transitory computer-readable medium of claim 8, the operations further comprising causing to send a poll indicates that the first device is awake during the target wake time service period.

13. A method comprising:
- determining, by an access point, a target wake time of a target wake time service period for a station device, wherein the target wake time occurs after a first beacon sent by the access point and before a second beacon sent by the access point, wherein the first beacon and the second beacons are consecutive beacons, wherein the target wake time occurs after the station device receives the first beacon and after the station device enters a first doze state after receiving the first beacon, and wherein the first doze state ends before the station device enters a second doze state before waking up and receiving the second beacon from the access point;
- causing to send the first beacon to one or more station devices, the first beacon comprising an indication of the target wake time; and
- causing to send one or more trigger frames during the target wake time service period.

14. The method of claim 13, wherein the first doze state occurs between a first trigger frame and a second trigger frame of the one or more trigger frames.

15. The method of claim 13, wherein the target wake time service period is periodic.

16. The method of claim 13, wherein the one or more trigger frames comprise a first trigger frame, and wherein the first trigger frame comprises an indication that the first trigger frame is the last trigger frame of the target wake time service period.

17. The method of claim 13, further comprising identifying a poll received from a station device of the one or more station devices, wherein the poll indicates that the station device is awake during the target wake time service period.

* * * * *